US005539982A

United States Patent [19]

Hosono et al.

[11] Patent Number: 5,539,982

[45] Date of Patent: Jul. 30, 1996

[54] METHOD OF MANUFACTURING AN INK JET RECORDING HEAD

[75] Inventors: Satoru Hosono; Takahiro Naka; Shuji Yonekubo; Satoshi Shinada; Minoru Usui, all of Nagano, Japan

[73] Assignee: Seiko Epson Corporation, Tokyo, Japan

[21] Appl. No.: 286,260

[22] Filed: Aug. 8, 1994

Related U.S. Application Data

[62] Division of Ser. No. 24,769, Mar. 2, 1993, Pat. No. 5,471, 732.

[30] Foreign Application Priority Data

| | | | |
|---|---|---|---|
| Mar. 3, 1992 | [JP] | Japan | 4-45194 |
| Sep. 10, 1992 | [JP] | Japan | 4-242222 |
| Sep. 16, 1992 | [JP] | Japan | 4-246778 |
| Feb. 22, 1993 | [JP] | Japan | 5-56553 |

[51] Int. Cl.[6] .......... B23P 15/00

[52] U.S. Cl. .......... 29/890.1; 347/70

[58] Field of Search .......... 29/890.1, 611; 347/70, 71, 68

[56] References Cited

U.S. PATENT DOCUMENTS

| | | | |
|---|---|---|---|
| 4,364,070 | 12/1982 | Matsuda et al. | 346/140 |
| 4,367,478 | 1/1983 | Larsson | 346/140 |
| 4,418,355 | 11/1983 | DeYoung | 346/140 |
| 4,438,191 | 3/1984 | Cloutier et al. | 430/324 |
| 4,641,153 | 2/1987 | Cruz-Uribe | 346/140 |
| 4,779,099 | 10/1988 | Lewis | 346/1.1 |

FOREIGN PATENT DOCUMENTS

| | | |
|---|---|---|
| 0443628 | 8/1991 | European Pat. Off. . |
| 55-65559 | 5/1980 | Japan . |
| 58-119872 | 7/1983 | Japan . |
| 60-8953 | 3/1985 | Japan . |
| 63-25942 | 5/1988 | Japan . |
| 2-51734 | 11/1990 | Japan . |
| 3-247453 | 11/1991 | Japan . |
| 3-284950 | 12/1991 | Japan . |
| 4-338550 | 11/1992 | Japan . |
| 4-338551 | 11/1992 | Japan . |

*Primary Examiner*—Irene Cuda

*Attorney, Agent, or Firm*—Sughrue, Mion, Zinn, Macpeak & Seas

[57] ABSTRACT

In an ink jet recording head in which pressure chambers are formed by fastening a vibration plate to a nozzle-opening contained member, and piezoelectric vibrators, which extend and contract in the axial direction, are fastened at the fore ends to the region of the vibration plate, islands are formed in the region of the vibration plate where is to be in contact with the piezoelectric vibrators, each of the islands being surrounded by a thinned part, the fore end of each piezoelectric vibrator is fastened to each island.

10 Claims, 7 Drawing Sheets

METHOD OF MANUFACTURING AN INK JET RECORDING HEAD

This is a divisional of application Ser. No. 08/024,769, filed Mar. 2, 1993, now U.S. Pat. No. 5,471,732.

BACKGROUND OF THE INVENTION

1. Field of the Invention

The present invention relates to an ink jet recording head of the type in which a plural number of piezoelectric vibrators are disposed in opposition to a plural number of nozzle openings, and ink droplets are jetted from the nozzle openings, with the aid of the extension of the piezoelectric vibrators.

2. Discussion of the Prior Art

The ink jet recording head of the on-demand type has been known. In this type of the recording head, a nozzle plate with a plural number of nozzle openings and a vibration plate partially elastically deformable by the piezoelectric vibrators are oppositely disposed thereby to form a pressure chamber. After ink is sucked into the pressure chamber through the contraction and extension of the piezoelectric vibrators, the vibrators are extended to jet ink droplets through the nozzle openings. The improved ink jet recording head of this type is also disclosed in U.S. Pat. No. 4,418,355. To improve the junction state of the piezoelectric vibrators and the vibration plate, a coupling member is interposed between each piezoelectric vibrator and the vibration plate. Use of the coupling member provides an efficient transmission of displacement of the piezoelectric vibrator to the pressure chamber.

In the technique disclosed in Japanese Patent Publication No. Sho. 63-25942, a leg is used for the same purpose, but the leg is wider than the piezoelectric member and its width is substantially equal to the channel.

In this patent, an additional work to set the coupling members between the piezoelectric vibrators and the vibration plate is essential. This work makes the manufacturing process complicated.

Sometimes it fails to efficiently transmit the displacement of the piezoelectric vibrator to the pressure chamber or the force generated by the piezoelectric vibrators reaches and deforms part of the vibration plate where should not be deformed. As a result, ink meniscus is instable, viz., the called cross talk is caused.

SUMMARY OF THE INVENTION

The present invention has been made in view of the above circumstances and has an object to provide an ink jet recording head in which islands to couple the piezoelectric vibrators with the vibration plate, and the vibration plate are formed in a one-piece construction.

Another object of the invention is to provide an ink jet recording head which includes islands capable of transmitting the vibration to the pressure chamber at the most efficiency and without giving adverse effects.

Still another object of the invention is to provide a method of manufacturing the above-mentioned ink jet recording head.

To achieve the above object, there is provided an ink jet recording head in which pressure chambers are formed by fastening a vibration plate to a nozzle-opening contained member, and piezoelectric vibrators, which extend and contract in the axial direction, are fastened at the fore ends thereof to the region of the vibration plate, wherein islands are formed in the region of the vibration plate where is to be in contact with the piezoelectric vibrators, each of the islands being surrounded by a thinned part, the fore end of each piezoelectric vibrator is fastened to each island.

Damped vibration of the driven piezoelectric vibrator transmits to the pressure chambers adjacent to the pressure chamber corresponding to the vibrating piezoelectric vibrator. For the pressure chamber corresponding to the vibrating vibrator, pressure is distributed over a broad range in the direction orthogonal to the linear array of nozzle openings.

Further, it efficiently transmits displacement of the piezoelectric vibrators to the pressure chamber, and holds back unstable motion of the ink meniscus, which arises from propagation of pressure to the adjacent pressure chambers.

BRIEF DESCRIPTION OF THE DRAWINGS

Other objects, advantages, and features of the present invention will be apparent when carefully reading the following detailed description in connection with the accompanying drawings, in which.

DETAILED DESCRIPTION OF THE PREFERRED EMBODIMENTS

The present invention will be described in detail with reference to the accompanying drawings.

Figure 2:
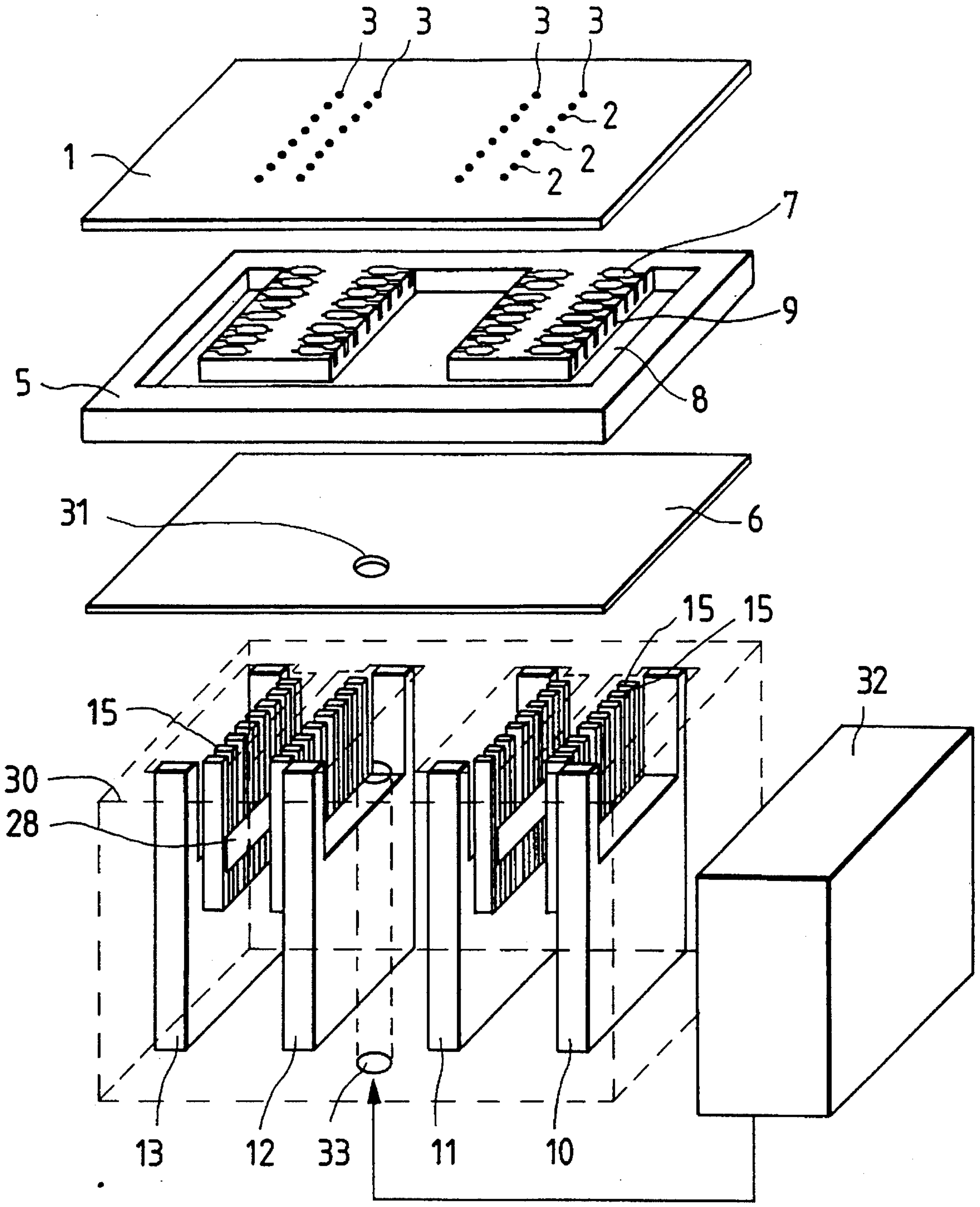
FIG. 2 is a perspective view of an ink jet recording head according to an embodiment of the present invention.
Figure 4:
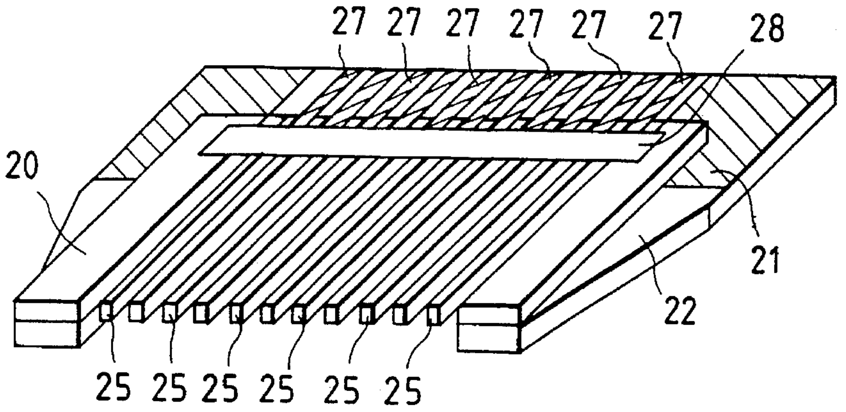
FIG. 4 is a perspective view showing an example of the resonator unit.

FIG. 2 is a perspective view of an ink jet recording head according to an embodiment of the present invention. As shown, a nozzle plate 1 contains four linear arrays 3 of nozzle openings 2. A spacer 5 is placed between the nozzle plate 1 and a vibration plate 6. The spacer 5 serves to define a reserve tank 35, pressure chambers 36, and a communicating path 37 (see FIG. 5). Through holes 7 and 8, and a concave portion 9 are formed at predetermined locations.

One surface of the vibration plate 6 faces the nozzle plate 1 with the spacer 5 interposing therebetween. The top ends of piezoelectric vibrators 15 of vibrator units 10, 11, 12 and 13 are brought in contact with the other surface of the vibration plate 6. Expansion and contraction of each vibrator 15 are transmitted to the pressure chambers 36 by means of the vibration plate 6.

Figure 3:
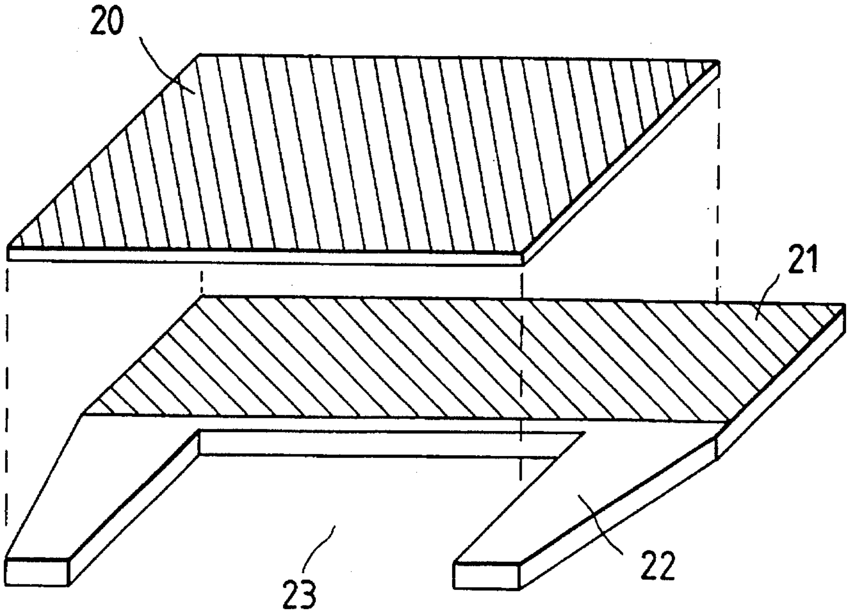
FIG. 3 is a perspective view showing a piezoelectric vibrating plate and a fixing plate, both forming a vibrator unit.

The structure of each of the vibrator units 10, 11, 12, and 13 will be described. A lamination-typed piezoelectric vibrating plate 20, which is capable of being driven at low voltage, consists of piezoelectric material and electrode material alternately layered in a sandwich manner (FIG. 3). The piezoelectric vibrating plate 20 is partially fixed to a fixing plate 22 by means of conductive adhesive. A common electrode 21 is formed on the fixing plate 22 having a U-shaped portion 23. A free end portion of the piezoelectric vibrating plate 20, which faces the U-shaped portion 23 of the fixing plate 22, is cut according to the array pitch of pressure chambers, thereby forming a plurality of vibrating elements 25. In the process of cutting the piezoelectric vibrating plate 20 into the vibrating elements 25, leads 27 for supplying a drive signal may be formed in such a manner that a cutting depth of a dicing saw, for example, is preset to the depth slightly exceeding the thickness of the common electrode 21. To form a common electrode 28, a conductive plate is bonded onto the surfaces of the vibrating elements 25 through conductive adhesive.

Upon applying a drive signal to the leads 27 and the common electrode 28, the vibrating elements 25 extend and contract in the longitudinal direction.

Returning to FIG. 2, reference numeral 30 designates a housing, containing the vibrator units 10, fastens the vibration plate 6, the spacer 5, and the nozzle plate 1, in a layered state, to the selective side of the piezoelectric vibrators 15, whereby forming a recording head. The housing 30 further contains a fluid path 33 for supplying ink from an ink tank 32 to the pressure chamber 31, through an opening 31 of the vibration plate 6.

Figure 5:
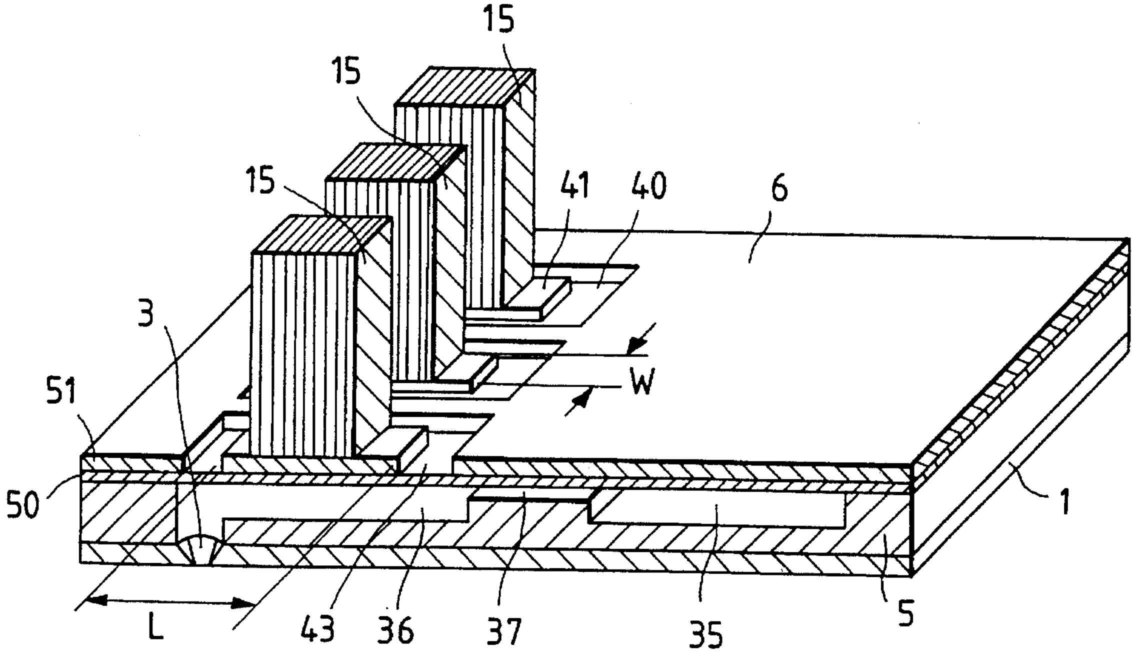
FIG. 5 is a perspective view, partly in cross section, showing the ink jet recording head, particularly the structure of the flow path in the recording head.
Figure 6A:
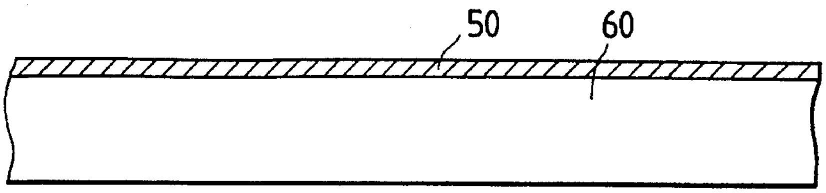
FIG. 6(*a*) to 6(*f*) show a set of sectional views useful in explaining a method of manufacturing a vibration plate according to the present invention.
Figure 6B:
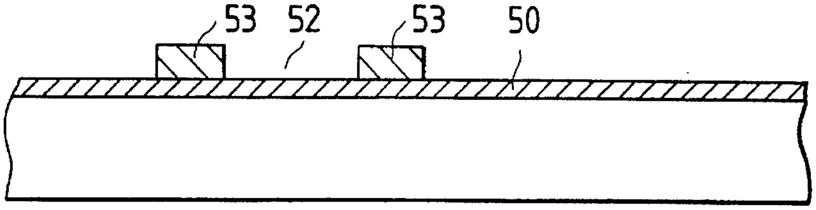
Figure 6C:
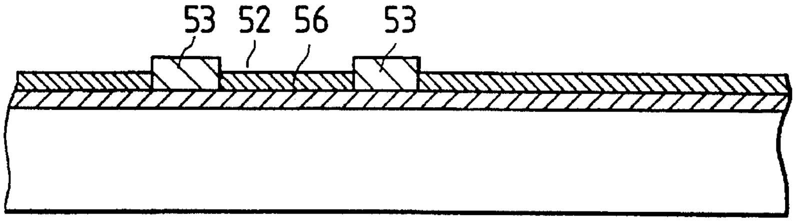
Figure 6D:
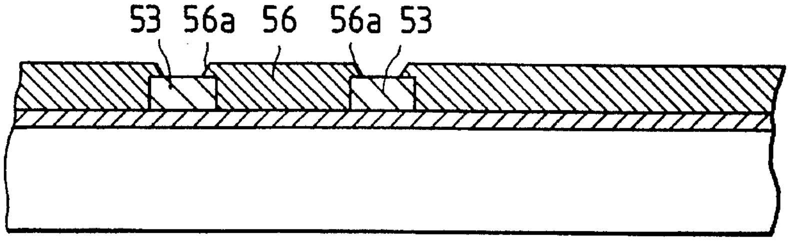
Figure 6E:
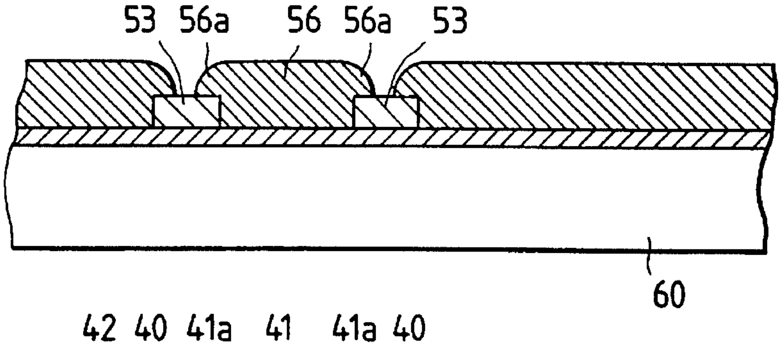
Figure 6F:
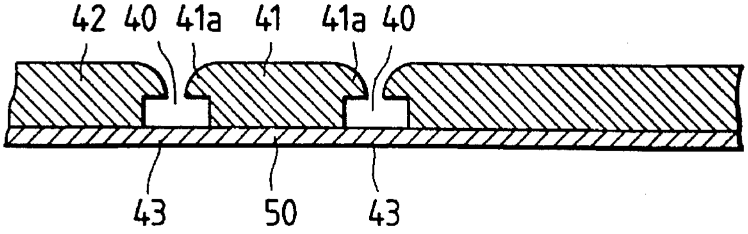

In FIG. 5 showing a perspective view, partly in cross section, of the ink jet recording head, the spacer 5 provides a space for forming the reserve tank 35 which receives ink through the opening 31, the pressure chambers 36, and the communicating path 37 which communicates the reserve tank 35 with the pressure chambers 36. The vibration plate 6 includes islands 41 at the locations to be respectively brought in contact with the piezoelectric vibrators 15. Each island 41 is surrounded by a concave portion 40. The piezoelectric vibrators 15 are fastened at the ends to the surfaces of the islands 41, respectively.

Figure 1:
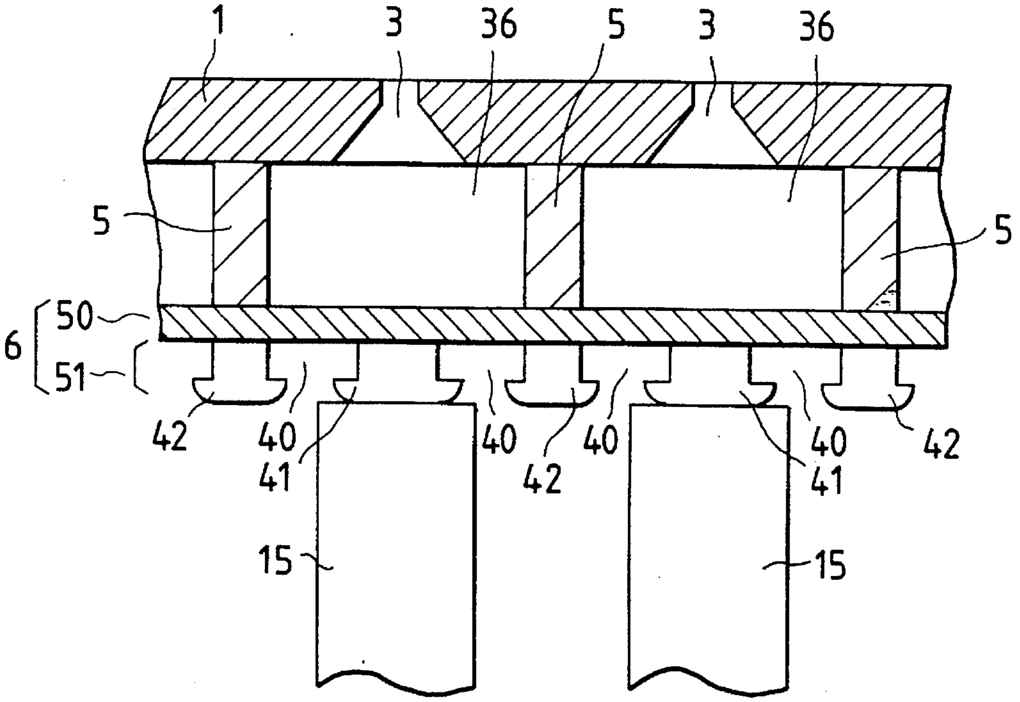
FIG. 1 is a cross sectional view showing the structure in the vicinity of a vibration plate in an ink jet recording head.

Turning now to FIG. 1, there is illustrated the detailed structure of the vibration plate 6 together with the structure near the nozzle openings. As shown, the vibration plate 6 consists of two layers, a first layer 50 and a second layer 51 as the islands 41, for example. The first layer 50 is a thin layer of 2 μm thick, and the second layer 51 is a thick layer of 18 μm. As a matter of course, the thickness of those layers 50 and 51 is not limited to those figures. The vibration plate 6 cooperates with the nozzle plate 1 and the spacer 5 interposed therebetween to form the pressure chambers 36. Each of the piezoelectric vibrators 15 is brought into contact with the tops of the corresponding islands 41 as the second layer 51 of the vibration plate 6.

The rigidity of the island 41 is preferably at least 1000 times as large as that of the first layer 50, which constitutes the thin layer 43 of the concave portion 40. That is, the thickness of the thick layer of the islands 41, is selected to be at least 10 times that of the thin layer 43. Alternatively, the product to the third power of a modulus of longitudinal elasticity of the thick layer and the thickness thereof is at least 1000 times the product to the third power of a modulus of longitudinal elasticity of the thin layer and the thickness thereof. The rigidity of a physical solid is generally proportional to the thickness thereof to the third power. Accordingly, if the thickness of the thick layer is set to be 10 times that of the thin layer, the rigidity against the force in the direction of its thickness is increased 1000 times. The rigidity of a physical solid is generally proportional to an elastic modulus thereof. Accordingly, material of high elastic modulus is used for the thick layer of which the rigidity must be high, and material of low elastic modulus is used for the thin layer of which the rigidity must be low to gain a deformable nature. Accordingly, the following mathematic expression is preferably satisfied:

$$(E1 \times t1^3)/(E2 \times t2^3) \geqq 1000$$

where $t_1$: thickness of the thick layer

E1: elastic modulus of the same $t_2$: thickness of the thin layer

E2: elastic modulus of the same

When the piezoelectric vibrator 15 contracts, the island 41 displaces downward while undergoing a reaction of the thin layer 43 of the concave portion 40. Where the rigidity of the islands 41 is high, the islands 41 per se is little deformed while the thin layer 43 of the concave portion 40 is greatly deformed. Where the rigidity of the islands 41 is low, the island 41 per se undergoes the reaction of the thin layer 43 to be deformed. As a result, the thin layer 43 is little deformed. Thus, when the rigidity of the island 41 is not much larger than that of the thin layer 43, displacement of the piezoelectric vibrator 15 is unsatisfactorily transformed into a change of the volume of the pressure chamber 36. Most of the displacement is lost in the form of a deformation of the island 41, and the displacement little contributes to the ink jetting action. To minimize the loss, the rigidity ratio must be set to be at least 1000.

An ink jet recording head was manufactured for the experiment. In the head, the same material was used for the islands 41 and the thin layer 43 of the concave portions 40. The pressure chamber 36 was 100 μm in width and 100 μm in depth. When the island 41 was 10 μm thick and the thin layer 43 was 2 μm thick, deformation of the pressure chamber 36 was unsatisfactory, and no ink was jetted from the nozzle openings. When the thickness of the islands 41 was increased to 20 μm, ink was jetted.

As the islands 41 become thicker, the technique to work them becomes more difficult. In this point, it is preferable to thin the thin layer 43 as possible. Specifically, when the thin layer 43 is made of metal, its thickness is preferably 5 μm or less. When it is made of resin, its thickness is preferably 10 μm or less. Where the resin is used for the thin layer 43, the voltage applied to the piezoelectric vibrators 15 will never cause current to ink. Accordingly, there is eliminated its adverse effects on the drive circuits and the like. A stable electrical detection of using up ink is ensured.

The island 41 is structured such that the length L of the portion of the island 41 where it is brought in contact with the first layer 50 is approximately two times the piezoelectric vibrator, and the width W thereof is approximately ⅓ times as large as the same. The island thus structured greatly impedes the transfer of a vibration of the piezoelectric vibrator, when driven, to the pressure chambers adjacent to the press chamber corresponding to the driven vibrator. For the pressure chamber 36 to which the driven piezoelectric vibrator 15 belongs, the island 41 uniformly distributes pressure over the broad range, which is orthogonal to the linear arrays of nozzle openings. The portion of the island 41 where it is brought into contact with the piezoelectric vibrator 15 has the width, which is selected to be large to such an extent that as not to disturb the vibration.

Each thick portion 41 of the second layer 51 defining the concave portion 40 is located in opposition to the spacer. With the aid of rigidity of the spacer 5, the thick portion 41 prevents the vibration plate 6 from being deflected in an undesired fashion.

The width W of the island 41 will be described. The width W of the island 41 is selected to be 80% or less of the width of the pressure chamber 36. The thus selected width of the island 41 suppresses the reaction of the thin layer 43 against the displacement of the piezoelectric vibrator 15, thereby improving the efficiency of transforming the vibrator displacement into the volume change of the pressure chambers 36. To gain a satisfactory efficiency of the displacement-to-volume transformation, the width of the concave portion 40, one side, must be at least 10% of the width of the pressure chamber 36. If so selected, the vibration (energy) of the piezoelectric vibrators 15 is not consumed by the deformation of the wall of the pressure chamber and fluctuation of the whole nozzle plate 1. No cross talk is caused.

The experiment conducted by the inventor showed that when the width W of the island 41 was 80 μm or less for the pressure chamber 36 of 100 μm in width, ink could be jetted. It is more preferable that the width W of the island 41 is half or less of the width of the pressure chamber 36. If the width is so selected, a required drive voltage could be reduced.

In FIG. 5, the width W of the island 41 is longer than the longer side of the piezoelectric vibrator 15. If the rigidity of the island 41 is 1000 times that of the thin layer 50 as described above, the deflection of the islands 41 per se is satisfactorily small and a volume change of the pressure chamber is satisfactorily large. In the invention, the width W of the island 41 is within the range of 50% to 90% of the length of the pressure chamber 36. Such selection of the island width is made in order to change the volume of the pressure chamber at the highest efficiency.

A sequence of process steps to manufacture the vibration plate 6 according to the present invention is illustrated in FIGS. 6(*a*) to 6(*f*).

An electrode is formed on the surface of a working substrate 60, which was finished as planar as possible. In this case, nonelectrolytic plating process is used for forming the electrode. Using the electrode, the first layer 50 of the working substrate 6 is formed, 1 to 10 μm thick, for example, by electroforming nickel (FIG. 6(*a*)). A pattern 53 with windows 52, which are coincident in shape with the bottom portions of the islands 41, is formed as a photoresist layer on the surface of the first layer 50 (FIG. 6(*b*)). The thickness of the pattern 53 is selected approximately within 5 to 10 μm.

An intermediate structure 55 thus constructed is electrolytically casted in such a manner that it is immersed in electrolyte containing nickel ion and current is fed at a given current density, with the first layer 50 as the minus electrode. As a result, nickel in the electrolyte is selectively deposited on the portions of the intermediate structure 55 where a photoresist layer is not formed. Those portions are the windows 52, for example. The thickness of the regions of the pattern 53 to be finished as thick portions are kept equal to the thickness of the first layer 50 (FIG. 6(*c*)). The electrolyte is an a aqueous solution essentially consisting of 30 W % of sulfamic acid nickel, 0.5 W % of nickel chloride, 4 W % of boric acid, 1 W % of brightener, and 0.5 W % of pit removal agent. The current density is approximately 1 to 2 mA/cm$^2$.

When nickel deposition grows to reach the top of each window, the edge effect operates, so that the nickel extends along the surface of the patterns 53, causing overhangs 56*a* (FIG. 6(*d*)). As the process proceeds, the nickel further extends in both the thickness and surface directions. When the nickel protrudes approximately 13 μm above the surfaces of patterns 53 and the second layer has grown, 18 to 23 μm thick, the current feeding is stopped (FIG. 6(*e*)). Then, the substrate 60 and the patterns 53 are removed (FIG. 6(*f*)). As a consequence, the vibration plate 6 with islands 41 each surrounded by the concave portion 40 is manufactured. The section of the islands 41 thus formed is in the form of a rivet.

When the first layer 50 is made of resin and the islands 41 are made of metal, it is possible to form the islands 41 by cutting or press work and to bond the formed islands 41 on the resin film. In another method, a metal plate is bonded on a resin film, and the metal plate is shaped into islands by cutting work or etching process. In a further method, resin is casted on a metal plate. Islands 41 are formed by etching the metal plate. A resin plate is etched to form the first layer 50 and the pressure chamber wall in a one-piece construction.

Figure 7:
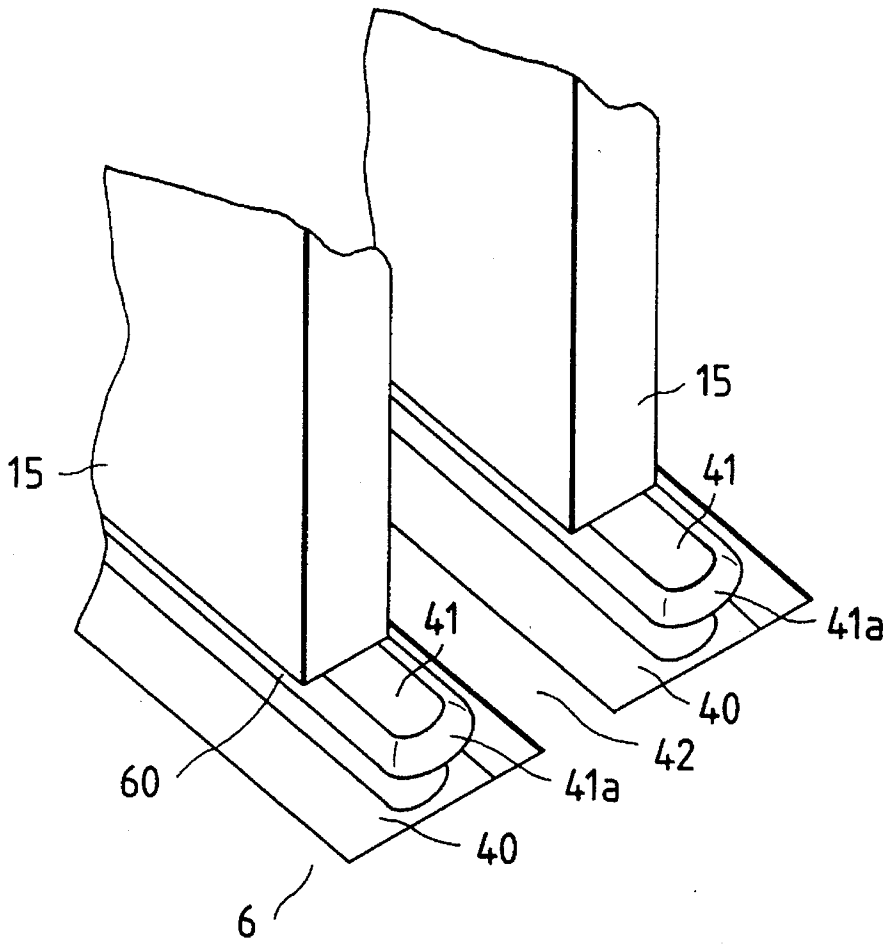
FIG. 7 is a perspective view showing how the vibrating plates and piezoelectric vibrators are mounted.
Figure 8:
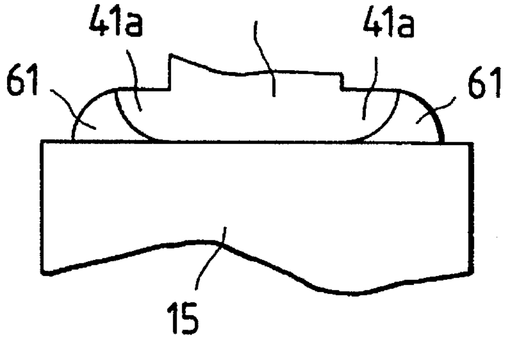
Fig. 8 is a sectional view showing a state that the vibrating plate and the piezoelectric vibrator are fastened.

After the top surfaces of the islands 41 are coated with adhesive, the fore ends of the piezoelectric vibrators 15 are brought into contact with the islands 41, as shown in FIG. 7. At this time, excessive adhesive 61 flows exclusively into the spaces 60 defined by the piezoelectric vibrators 15 and the islands 41. With the adhesive, fixing of those components is further reinforced.

In the ink jet recording head, when drive voltage is applied to the piezoelectric vibrators 15, the piezoelectric vibrators extend. Displacement of the leading ends of the piezoelectric vibrators 15 is transferred through the islands 41 to the vibration plate 6. The root of each island 41, the size of the boundary portion of the island to the first layer 50, when it is measured in the direction of the linear array of the nozzle openings, viz., width direction, is smaller than the piezoelectric vibrator. The size of the boundary portion orthogonal to the linear array of the nozzle openings is longer than the piezoelectric vibrator. With provision of the concave portion 40 around the island, the piezoelectric vibrators 15, when displaced, presses the vibration plate 6 in the area as narrow as possible in the direction of the linear array of the nozzle openings, and in an area larger than the piezoelectric vibrator 15 in the direction orthogonal to the nozzle opening array.

The ink jet recording head thus organized has the following beneficial effects. In transmitting displacement of the piezoelectric vibrators to one pressure chamber 36, no pressure is propagated to other pressure chambers 36 adjacent to a linear array of nozzle openings of the one pressure chamber 36. A high transmission efficiency is gained with matching of acoustic impedance. No local deformation of the pressure chambers 36 is caused. Accordingly, the energy of the piezoelectric vibrators 15 can be efficiently used for spouting ink droplets.

Figure 9:
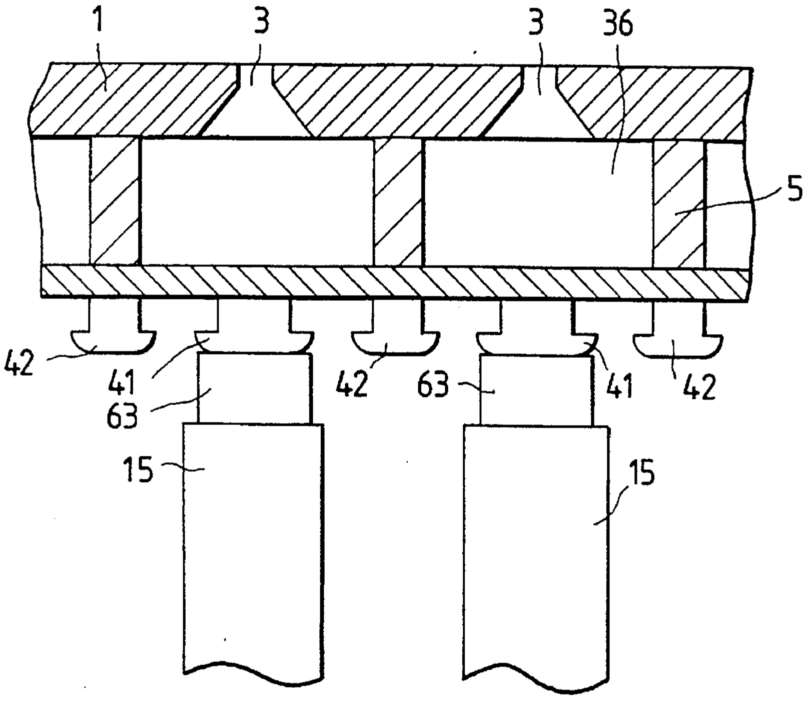
FIG. 9 is a sectional view showing another embodiment of an ink jet recording head according to the present invention.

In the embodiment as mentioned above, the piezoelectric vibrators 15 are directly put on the islands 41 of the piezoelectric vibrators 15. In some specific cases, an intermediate member 63 may be provided between each of the piezoelectric vibrators 15 and the corresponding island 41, as shown in FIG. 9. The end of the piezoelectric vibrator 15 contains a bundle of electrodes for driving the piezoelectric vibrators 15. The vibration plate is made of conductive material such as nickel. For this reason, if some specific electrode structure is employed, the piezoelectric vibrators 15 are possibly shortcircuited through the vibration plate 6. To avoid the shortcircuiting, it is preferable to interpose the intermediate member 63 between the piezoelectric vibrator and the island.

Figure 10:
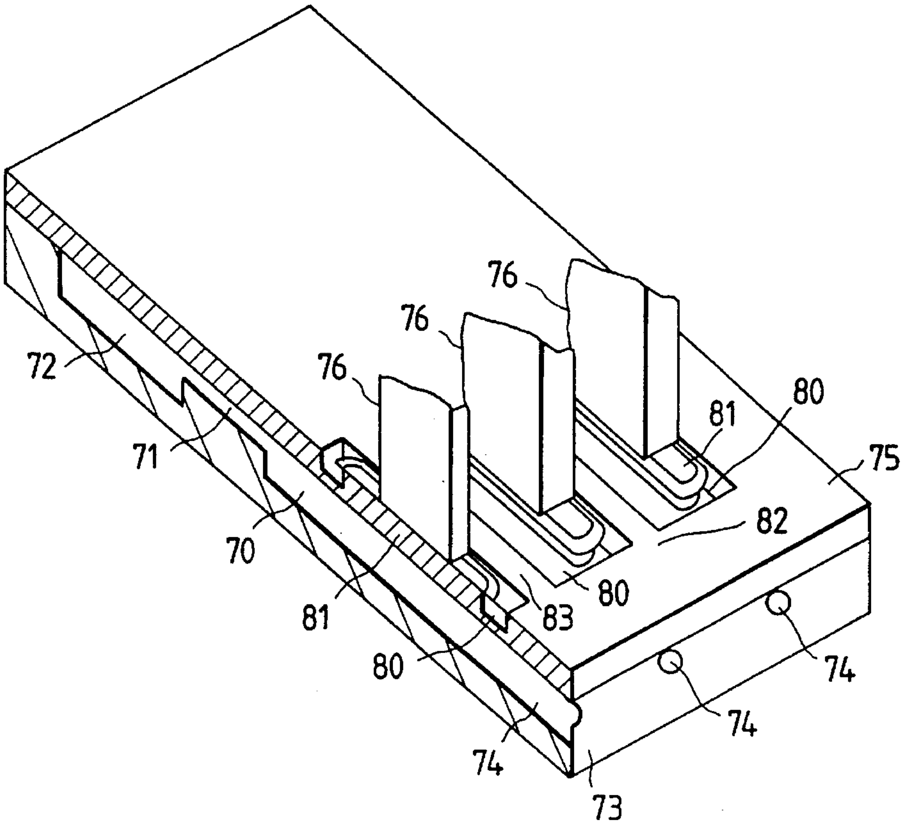
FIG. 10 is a perspective view showing yet another embodiment of an ink jet recording head according to the present invention.

In the above-mentioned embodiment, the nozzle openings are opposed to the piezoelectric vibrators 15. The invention may be applied for another type of ink jet recording head as shown in FIG. 10. In this recording head, nozzle openings 74 are formed in one side of a substrate 73 which includes concave portions 70, 71 and 71 for forming pressure chambers, communicating paths and a reserve tank. A vibration plate 75 is applied to the side of the substrate in which the concave portions 70, 71, and 71 are formed, thereby sealing the substrate. The direction of spouting ink droplets is orthogonal to the direction of vibration of piezoelectric vibrators 76. To implement the invention in this type of the ink jet recording head, in the region of the vibration plate, which faces the concave portion 70 to serve as the pressure chamber, islands 81 are formed separated from another area 81 by means of concave portions 80. The piezoelectric vibrators 76 are fastened to the vibration plate 75, with the islands 81 interposing therebetween. In this case, a thick part 83 of the vibration plate between the adjacent islands 81 is located in opposition to the wall defining the pressure chamber. Therefore, it increases the rigidity of the region of the vibration plate 75, which is other than the region thereof opposed to the pressure chamber. The increased rigidity contributes to suppression of the cross talk owing to the deformation of the vibration plate 75.

Figure 11:
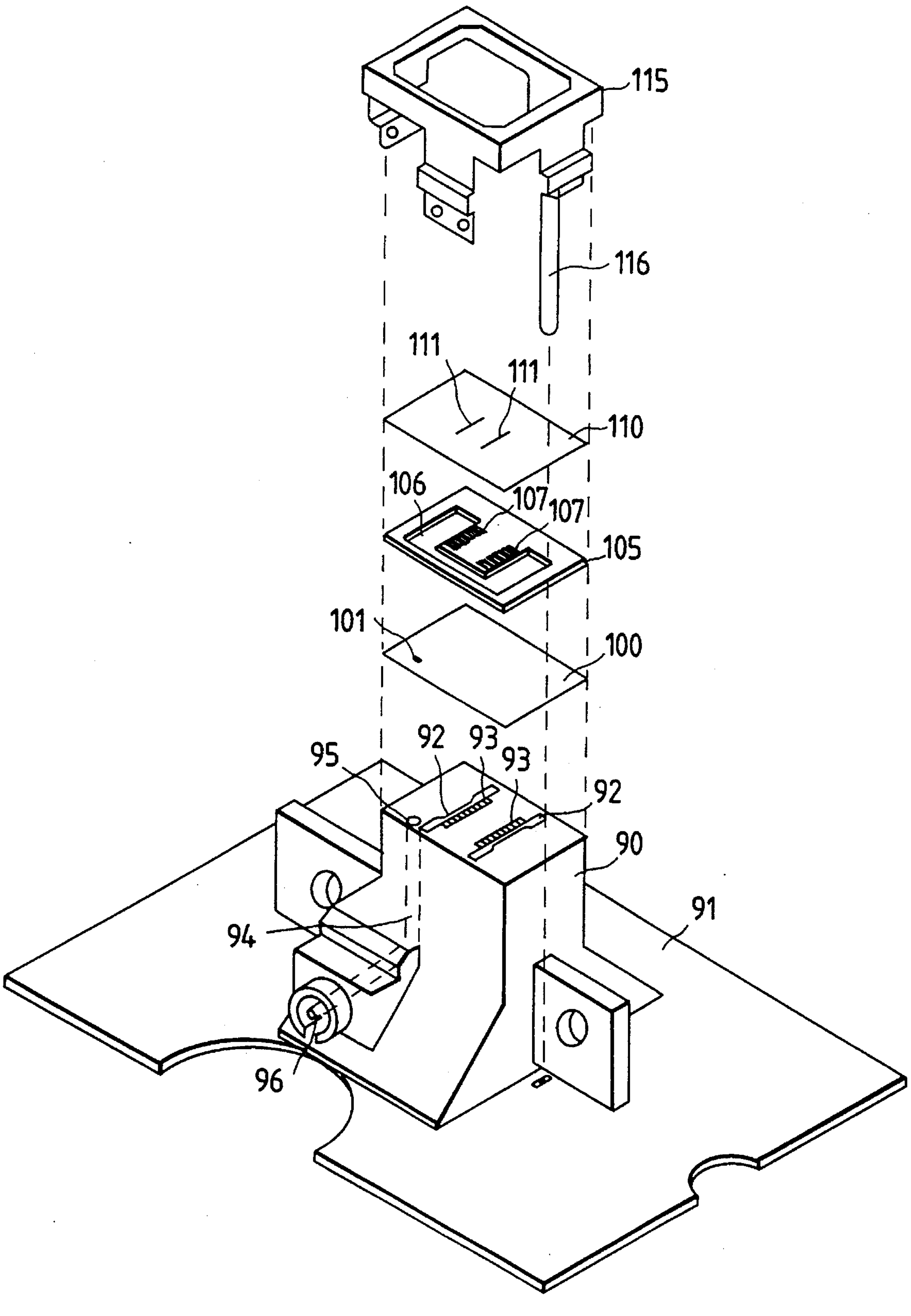
FIG. 11 is an exploded view showing an ink jet recording head which uses the vibration plate according to the invention.

FIG. 11 is an exploded view showing an ink jet recording head which uses the vibration plate according to the invention. In the figure, reference numeral 90 designates a base fastened to a board 91 on which a drive circuit and the like are mounted. Vibration units 93 each including a plural number of piezoelectric vibrators are contained in unit chambers 92 of the base. Further, the base contains an ink supply pipe 94 for supplying ink from the ink cartridge to through-holes. One end of the ink supply pipe 94 has an opening 95 communicating with a through-hole 101 forming a reserve tank. The other end of the same communicates with a connection needle 96 connecting to an ink cartridge.

Reference numeral 100 designates the vibration plate, which is essential to the invention. The side of the vibration plate 100, which confronts with the base 90, includes islands 41 (see FIG. 5, not shown in FIG. 11) to be in contact with the fore ends of the piezoelectric vibrators, and a through-hole 101 communicating with the opening 95 of the ink supply pipe. A spacer 105 includes through holes 106 and 107 forming the reserve tank communicating with the through-hole 101 and the pressure chamber.

A nozzle plate 110 has nozzle openings 111 at the location opposed to the through hole 107 to serve as the pressure chamber.

The vibration plate 100, the spacer 105, and the nozzle plate 110 are layered on the base 90, and hermetically fastened to the base 90 by means of a metal frame 115. A lead 116 extended from the frame 115 is connected to the ground terminal of the drive circuit for the nozzle plate 110. With this earthing, the nozzle plate 110 is not charged, so that no dust will attach to the nozzle openings.

As described above, an ink jet recording head in which pressure chambers are formed by fastening a vibration plate to a nozzle-opening contained member, and piezoelectric vibrators, which extend and contract in the axial direction, are fastened at the fore ends to the region of the vibration plate, wherein islands are formed in the region of the vibration plate where is to be in contact with the piezoelectric vibrators, each of said islands being surrounded by a thinned Dart, the fore end of each piezoelectric vibrator is fastened to each said island. With such a construction of the head, there is eliminated the mounting work for mounting the coupling member to couple the piezoelectric vibrators with the vibration plate. Vibration of the piezoelectric vibrators can be efficiently transferred to the pressure chambers, through the thinned parts around the vibration regions. When the electroforming is used for forming the islands, a depressed part is formed around the fore end of each piezoelectric vibrator when it is brought into contact with the corresponding island. The concave parts receive excessive adhesive.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method of manufacturing a vibration plate for an ink jet recording heady comprising the steps of:

forming a pattern on a surface of a first layer which is to serve as a main body of the vibrating plate, said pattern being made of nonconductive material, said pattern having raised areas and window areas, each of said raised areas having a surface which is displaced from said first layer and said window areas being located in positions corresponding to islands;

performing an electroforming process so that an electroformed layer grows in the wind areas of said pattern;

continuing the electroforming process until the electroformed layer is grown to partially cover said surface of each of said raised areas; and removing said pattern layer from said electroformed layer, resulting in the main body of the vibration plate having islands, each of which is surrounded by a concave portion.

2. A method of manufacturing an ink jet recording head according to claim 1 wherein a thickness of said first layer is in the range of 1 to 10 micrometers.

3. A method of manufacturing an ink jet recording head according to claim 1, wherein said pattern is formed as a photoresist layer on the surface of said first layer.

4. A method of manufacturing an ink jet recording head according to claim 3, wherein said electroforming process further comprises the step of electrolytically depositing a component of an electrolyte on the surface of said first layer where said pattern is not formed to form a second layer, said depositing step continuing until said second layer overhangs a surface of said pattern.

5. A method of manufacturing an ink jet recording head according to claim 4, wherein said component of said electrolyte is nickel.

6. A method of manufacturing an ink jet recording head according to claim 5, wherein said step of electrolytically depositing a component of an electrolyte comprises the step of feeding electrical current at a given current density.

7. A method of manufacturing an ink jet recording head according to claim 6, wherein said current density is in the range of 1 to 2 $mA/cm^2$.

8. A method of manufacturing an ink jet recording head according to claim 6, wherein said current feeding is stopped when said second layer achieves a thickness in the range of 18 to 23 micrometers.

9. A method of manufacturing an ink jet recording head according to claim 1, wherein said removing step results in formation of a vibration plate with islands, each island surrounded by a concave portion.

10. A method of manufacturing an ink jet recording head as set forth in claim 1, wherein said first layer is formed by electroforming nickel.

* * * * *